(12) United States Patent
Hasan et al.

(10) Patent No.: US 11,333,200 B2
(45) Date of Patent: May 17, 2022

(54) METHOD FOR MANUFACTURING A PITCH BEARING OR A YAW BEARING OF A WIND TURBINE VIA ADDITIVE MANUFACTURING

(71) Applicant: General Electric Company, Schenectady, NY (US)

(72) Inventors: Raed Zuhair Hasan, Greenville, SC (US); Adam Daniel Minadeo, Greenville, SC (US); John P. Davis, Duanesburg, NY (US); Aaron Wertz, Cincinnati, OH (US); Ganesh Raut, Bangalore (IN); Souvik Porel, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/253,194

(22) PCT Filed: Jun. 20, 2019

(86) PCT No.: PCT/US2019/038223
§ 371 (c)(1),
(2) Date: Dec. 17, 2020

(87) PCT Pub. No.: WO2019/246389
PCT Pub. Date: Dec. 26, 2019

(65) Prior Publication Data
US 2021/0254667 A1     Aug. 19, 2021

(30) Foreign Application Priority Data
Jun. 21, 2018   (IN) ............................. 201841023144

(51) Int. Cl.
*F16C 33/64* (2006.01)
*C23C 4/067* (2016.01)
(Continued)

(52) U.S. Cl.
CPC ............... *F16C 33/64* (2013.01); *B22F 3/24* (2013.01); *B22F 10/20* (2021.01); *C23C 4/067* (2016.01);
(Continued)

(58) Field of Classification Search
CPC ........ F16C 33/64; F16C 33/62; F16C 33/581; F16C 33/586; F16C 2360/31;
(Continued)

(56) References Cited

U.S. PATENT DOCUMENTS

| 7,331,761 B2 | 2/2008 | Hansen et al. |
| 2014/0127018 A1* | 5/2014 | Pasquet ................. F03D 7/0224 416/153 |

(Continued)

FOREIGN PATENT DOCUMENTS

| CN | 105 020 265 A | 11/2015 |
| JP | 2009 115139 A | 5/2009 |

OTHER PUBLICATIONS

PCT Search Report, dated Sep. 16, 2019.

*Primary Examiner* — Moshe Wilensky
(74) *Attorney, Agent, or Firm* — Dority & Manning, P.A.

(57) ABSTRACT

A method for manufacturing a pitch bearing or a yaw bearing for a wind turbine includes forming an outer race of the bearing of a base material. The method also includes forming an inner race of the bearing of the base material. Further, one of the inner race or the outer race defines a circumferential surface comprising a plurality of gear teeth. The method further includes arranging the inner race within the outer race. In addition, the method includes providing a plurality of roller elements between the outer and inner races. Moreover, the method includes applying a coating material to at least a portion of the plurality of gear teeth via an additive manufacturing process. The coating material is
(Continued)

different than the base material. As such, the coating material provides at least one of increased hardness, strength, or durability to the base material.

10 Claims, 8 Drawing Sheets

(51) Int. Cl.
    *B22F 10/20*     (2021.01)
    *B22F 3/24*     (2006.01)
    *C23C 4/10*     (2016.01)
    *F16C 33/58*     (2006.01)
    *F16C 33/62*     (2006.01)
    *B33Y 10/00*     (2015.01)
    *B33Y 80/00*     (2015.01)

(52) U.S. Cl.
    CPC .............. *C23C 4/10* (2013.01); *F16C 33/581* (2013.01); *F16C 33/586* (2013.01); *F16C 33/62* (2013.01); *B22F 2003/247* (2013.01); *B33Y 10/00* (2014.12); *B33Y 80/00* (2014.12); *F16C 2300/14* (2013.01); *F16C 2360/31* (2013.01)

(58) Field of Classification Search
    CPC ........ F16C 2300/14; B22F 3/24; B22F 10/20; B22F 2003/247; C23C 4/10; C23C 4/067; B33Y 10/00; B33Y 80/00
    See application file for complete search history.

(56) References Cited

U.S. PATENT DOCUMENTS

| | | |
|---|---|---|
| 2014/0254970 A1 | 9/2014 | Guilford |
| 2018/0106294 A1 | 4/2018 | Hiramatsu |
| 2018/0156203 A1* | 6/2018 | Christensen .......... F03D 7/0224 |
| 2019/0136962 A1* | 5/2019 | Hasan .................. F16H 57/032 |

* cited by examiner

METHOD FOR MANUFACTURING A PITCH BEARING OR A YAW BEARING OF A WIND TURBINE VIA ADDITIVE MANUFACTURING

FIELD OF THE INVENTION

The present disclosure relates in general to wind turbines, and more particularly to a method of manufacturing a pitch bearing or a yaw bearing of a wind turbine, at least in part, via additive manufacturing.

BACKGROUND OF THE INVENTION

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

To properly orient the nacelle and the rotor blades relative to the direction of the wind, wind turbines typically include one or more yaw or pitch bearings. Yaw bearings permit rotation of the nacelle and are mounted between the tower and the nacelle. Pitch bearings permit rotation of the rotor blades and are mounted between the rotatable hub and the rotor blade. Currently, yaw and pitch bearings are slewing ring bearings that include an outer race and an inner race with a plurality of ball bearings therebetween. Further, a typical pitch bearing includes a plurality of gear teeth on the inner race, whereas a typical yaw bearing includes a plurality of gear teeth on the outer race. Thus, one or more drive mechanisms are configured to drive the bearings by engaging the gear teeth.

The inner and outer races of conventional pitch and yaw bearings are manufacturing via a forging process, which can be time-consuming and expensive. Accordingly, an improved method of manufacturing the yaw and pitch bearings of a wind turbine would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for manufacturing a slewing ring bearing for a wind turbine (e.g. such as pitch bearing or a yaw bearing). The method includes forming an outer race of the slewing ring bearing of a base material. The method also includes forming an inner race of the slewing ring bearing of the base material. Further, one of the inner race or the outer race defines a circumferential surface comprising a plurality of gear teeth. The method further includes arranging the inner race within the outer race. In addition, the method includes providing a plurality of roller elements between the outer and inner races. Moreover, the method includes applying a coating material to at least a portion of the plurality of gear teeth via an additive manufacturing process. The coating material is different than the base material. As such, the coating material provides at least one of increased hardness, strength, or durability to the base material.

In one embodiment, the method includes applying the coating material to either or both of the inner and outer races via the additive manufacturing process. In several embodiments, the method may also include machining the inner race, the outer race, and/or the plurality of gear teeth after applying the coating material. In such embodiments, the machining step may include hobbing and/or grinding the inner race, the outer race, and/or the plurality of gear teeth after applying the coating material.

In certain embodiments, the additive manufacturing process described herein may include cold spraying, thermal spray, laser cladding, binder jetting, material jetting, directed energy deposition, powder bed fusion, or any other suitable additive technique.

In another embodiment, the coating material may include boron nitride, aluminum oxide, silicon carbide, tungsten carbide, a nickel-based alloy, or any other material capable of providing the desired hardness.

In further embodiments, the step of forming the outer race and the inner race of the slewing ring bearing of the base material may include casting the outer race and the inner race. For example, in such embodiments, the step of casting the outer race and the inner race may include pouring a liquid material into molds of the inner race and the outer race and allowing the liquid material to solidify in the molds so as to form the inner race and the outer race.

In additional embodiments, the base material may include steel, iron, ductile iron, or any other suitable materials or combinations thereof.

In particular embodiments, the portion of the plurality of gear teeth that includes the coating material may include about half of the plurality of gear teeth (e.g. only the portion that engages that yaw and/or pitch drive mechanisms).

In another aspect, the present disclosure is directed to a slewing ring bearing for a wind turbine. The slewing ring bearing includes an outer race and an inner race arranged within the outer race with the inner and outer races being formed of a base material. At least one of the outer race or the inner race is rotatable relative to the other via a plurality of roller elements. Further, at least one of the inner race or the outer race defines a circumferential surface having a plurality of gear teeth. The slewing ring bearing also includes a coating material printed on at least a portion of the plurality of gear teeth and the inner and outer races via an additive manufacturing process. The coating material is different than the base material. As such, the coating material provides at least one of increased hardness, strength, or durability to the base material. It should also be understood that the slewing ring bearing may further include any of the additional features described herein.

In yet another aspect, the present disclosure is directed to a method for manufacturing a slewing ring bearing for a wind turbine. The method includes forming an outer race of the slewing ring bearing of a base material. The method also includes forming an inner race of the slewing ring bearing of the base material. At least one of the inner race or the outer race defines a circumferential surface comprising a plurality of gear teeth. The method further includes arranging the inner race within the outer race. In addition, the method includes providing a plurality of roller elements between the outer and inner races. Moreover, the method includes applying a coating material to at least one of the outer race or the inner race via an additive manufacturing process. The coating material is different than the base material. As such, the coating material provides at least one of increased hardness, strength, or durability to the base material. It should also be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS OF THE INVENTION

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method for manufacturing pitch and/or yaw bearings of a wind turbine using additive manufacturing techniques. More particularly, the bearing races and gear teeth can be formed of a first, base material, e.g. via casting or forging, with a different, coating material subsequently applied to the gear teeth (as well as the inner and outer races) to provide an increased hardness, strength, durability, etc. Thus, methods of the present disclosure provide an improved process that allows the required hardened material properties to be provided at the gear teeth and bearing race interfaces only (i.e. rather than the entire part).

Figure 1:
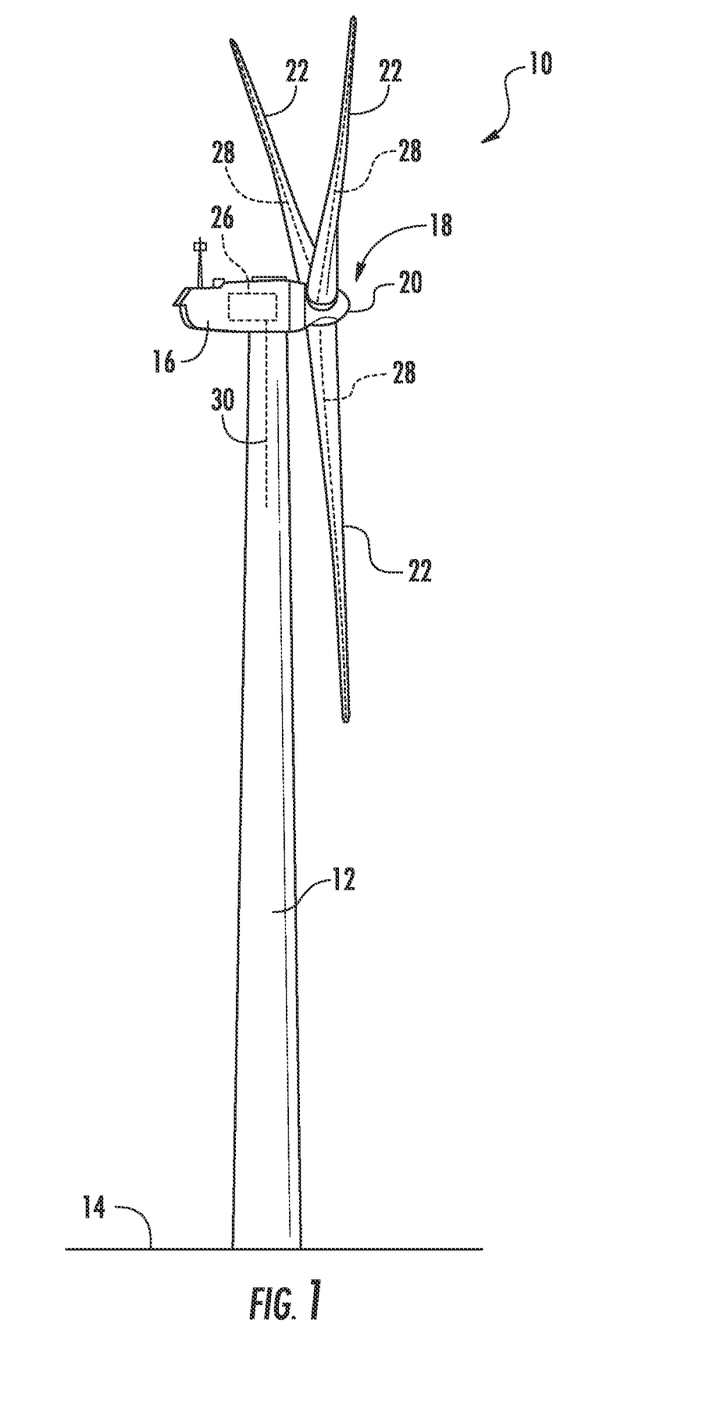
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
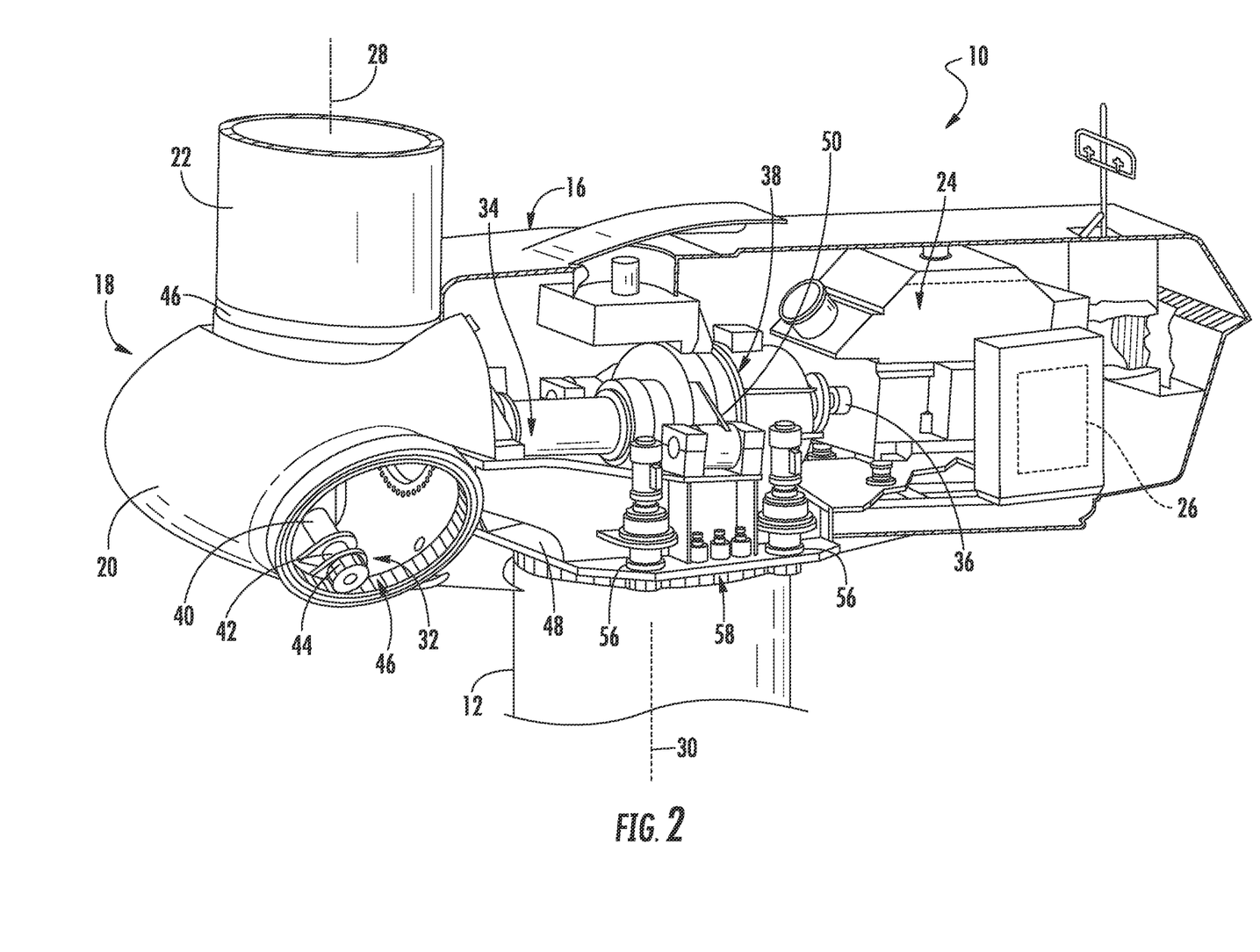
FIG. 2 illustrates a detailed, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the nacelle 16 may house the generator 24, which is coupled to the rotor 18 for producing electrical power from the rotational energy generated by the rotor 18. For example, as shown, the rotor 18 may include a rotor shaft 34 coupled to the rotatable hub 20 for rotation therewith. The rotor shaft 34 may, in turn, be rotatably coupled to a generator shaft 36 of the generator 24 through a gearbox 38 connected to a bedplate support frame 48 by a torque support 50. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10 to rotate the nacelle 16 about a yaw axis 30).

Figure 3:
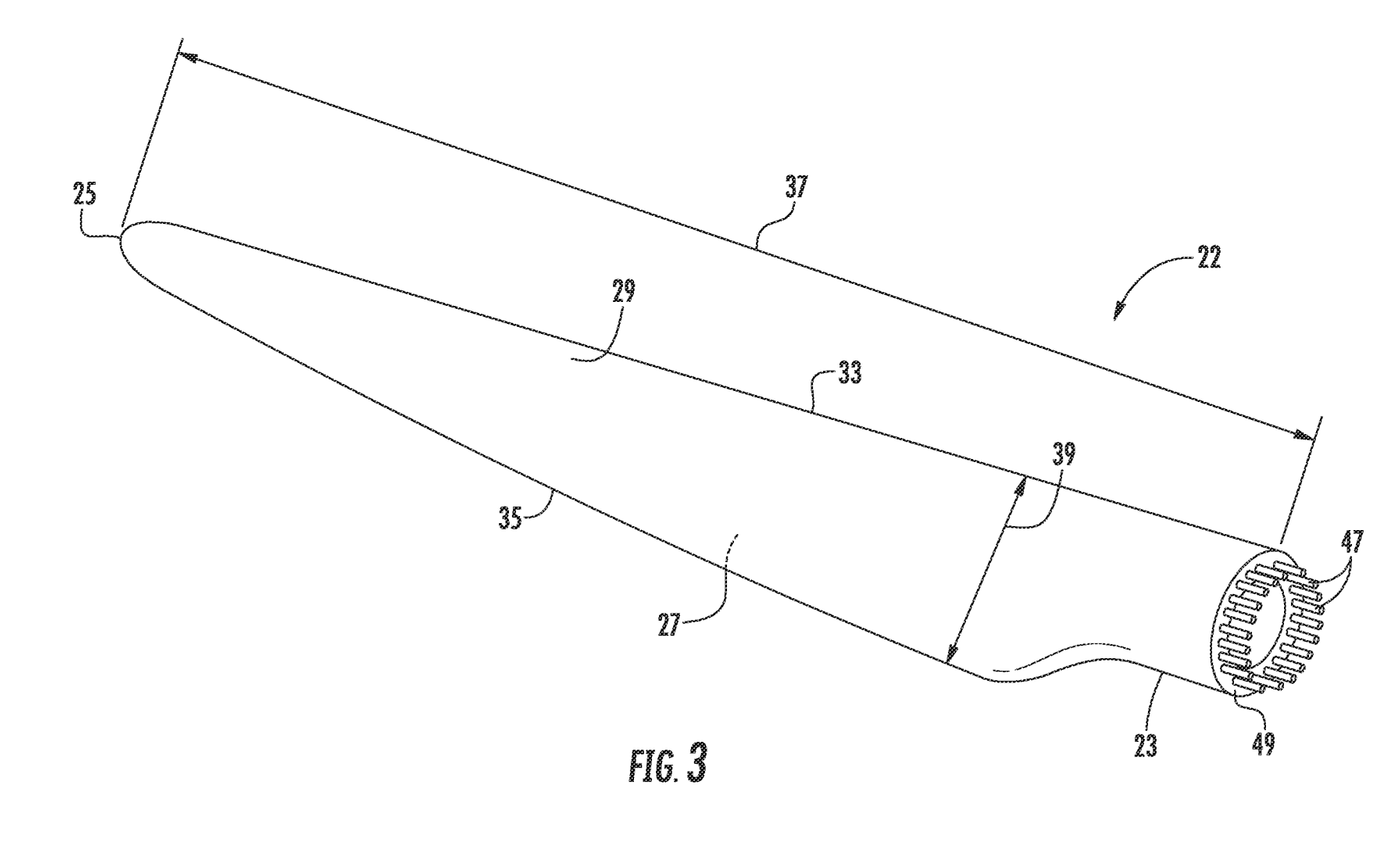
FIG. 3 illustrates a perspective view of one embodiment of a rotor blade of a wind turbine according to the present disclosure.

Referring now to FIG. 3, a perspective view of one of the rotor blades 22 shown in FIG. 1 is illustrated in accordance with aspects of the present subject matter. As shown, the rotor blade 22 includes a blade root 23 configured for mounting the rotor blade 22 to the hub 20 of the wind turbine 10 (FIG. 1) and a blade tip 25 disposed opposite the blade root 23. As is generally understood, the rotor blade 22 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, as shown, the rotor blade 22 may generally include a pressure side 27 and a suction side 29 extending between a leading edge 33 and a trailing edge 35. Additionally, the rotor blade 22 may have a span 37 defining the total length of the rotor blade 22 between the blade root 23 and the blade tip 25 and a chord 39 defining the total length of the rotor blade 22 between the leading edge 33 and the trailing edge 35. As is generally understood, the chord 39 may vary in length with respect to the span 37 as the rotor blade 22 extends from the blade root 23 to the blade tip 25.

Figure 4:
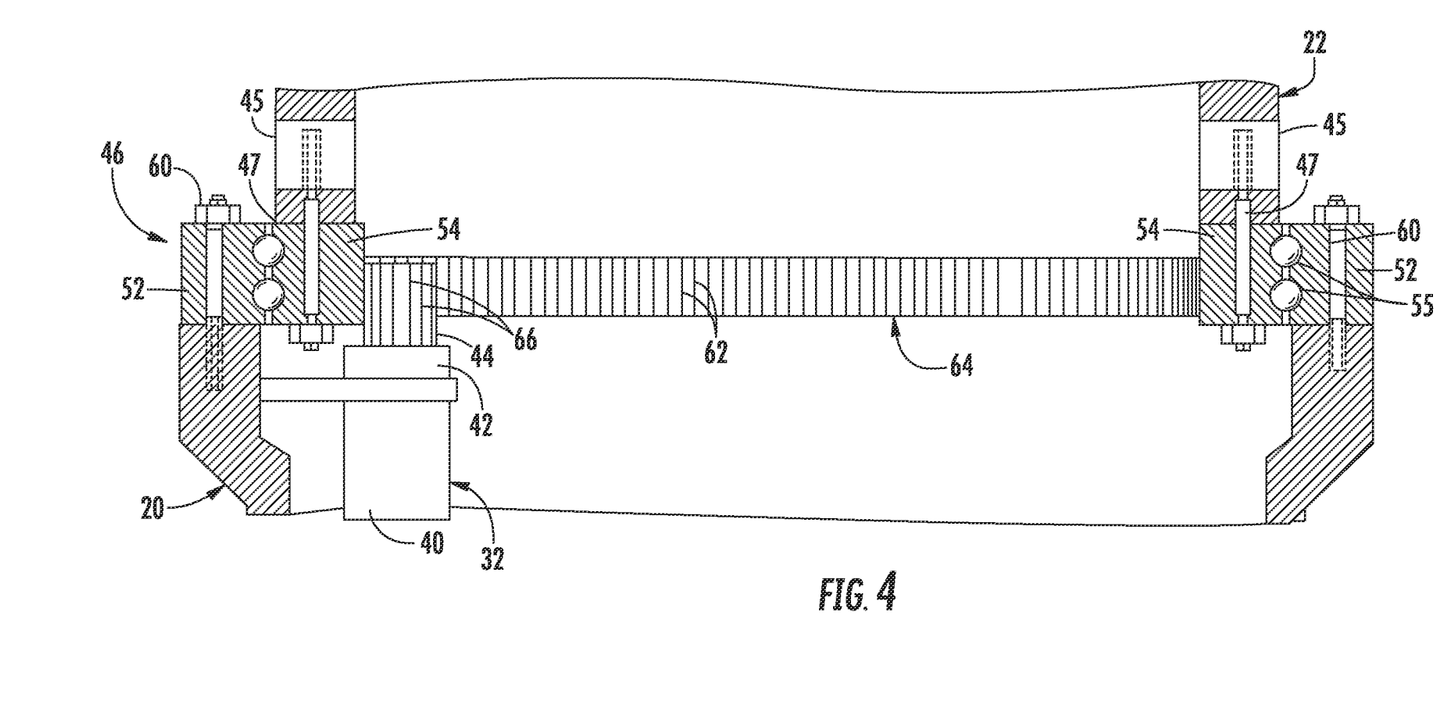
FIG. 4 illustrates a cross-sectional view of one embodiment of an interface between a rotor blade a hub of a wind turbine according to the present disclosure, particularly illustrating a pitch bearing arranged therebetween.

Moreover, as shown in FIGS. 3 and 4, the rotor blade 22 may also include a plurality of T-bolts or root attachment assemblies for coupling the blade root 23 to the hub 20 of the wind turbine 10. In general, as shown particularly in FIG. 4, each root attachment assembly may include a barrel nut 45 mounted within a portion of the blade root 23 and a root bolt 47 coupled to and extending from the barrel nut 45 so as to project outwardly from a root end 49 of the blade root 23. In addition, the root bolts 47 may be threaded and may project outwardly from the root end 49 of the blade root 23. By projecting outwardly from the root end 49, the root bolts 47 may generally be used to couple the blade root 23 to the hub 20 (e.g., via a pitch bearing 46).

Figure 5:
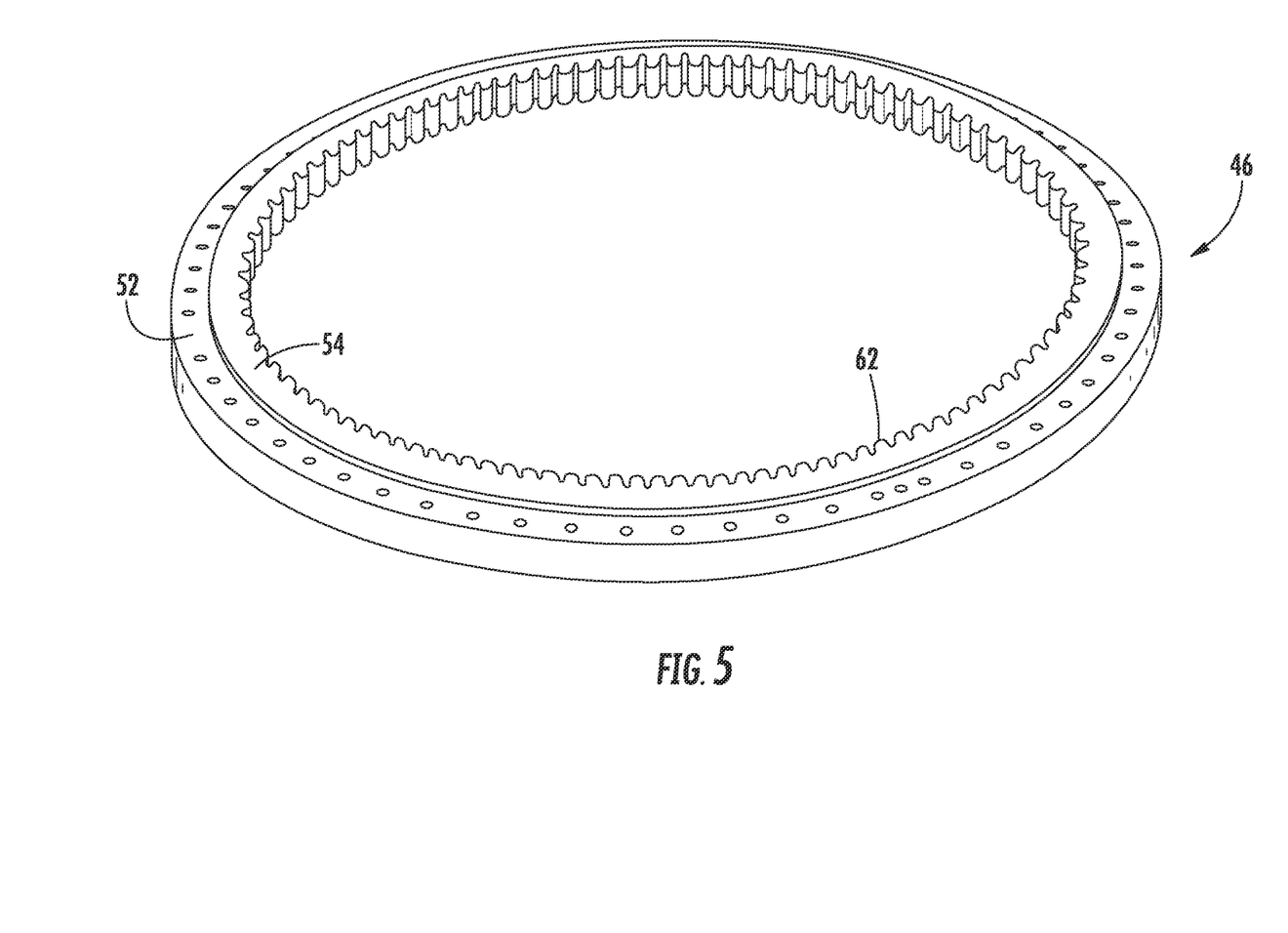
FIG. 5 illustrates a perspective view of one embodiment of a pitch bearing of a wind turbine according to the present disclosure.

Referring particularly to FIGS. 4 and 5, the pitch bearing 46 includes an outer bearing race 52, an inner bearing race 54, and a plurality of roller elements (e.g., ball bearings 55) disposed between the outer and inner races 52, 54. The outer race 52 is generally configured to be mounted to the hub 20 using a plurality of hub bolts 60 and/or other suitable fastening mechanisms. Similarly, the inner race 54 is generally configured to be mounted to the blade root 23 of the rotor blade 22 using root bolts 47. As is generally understood, the inner race 54 may be configured to be rotated relative to the outer race 52 (via the roller elements 55) to allow the pitch angle of each rotor blade 22 to be adjusted. As shown in FIGS. 2 and 4, such relative rotation of the outer and inner races 52, 54 may be achieved using the pitch adjustment mechanism 32 described herein. For example, as shown, a plurality of gear teeth 62 may be formed along an inner circumference 64 of the inner race 54 with the gear teeth 62 being configured to mesh with corresponding gear teeth 66 formed on the pitch drive pinion 44. Thus, due to meshing of the gear teeth 62, 66 rotation of the pitch drive pinion 44 results in rotation of the inner race 54 relative to the outer race 52 and, thus, rotation of the rotor blade 22 relative to the hub 20.

Figure 6:
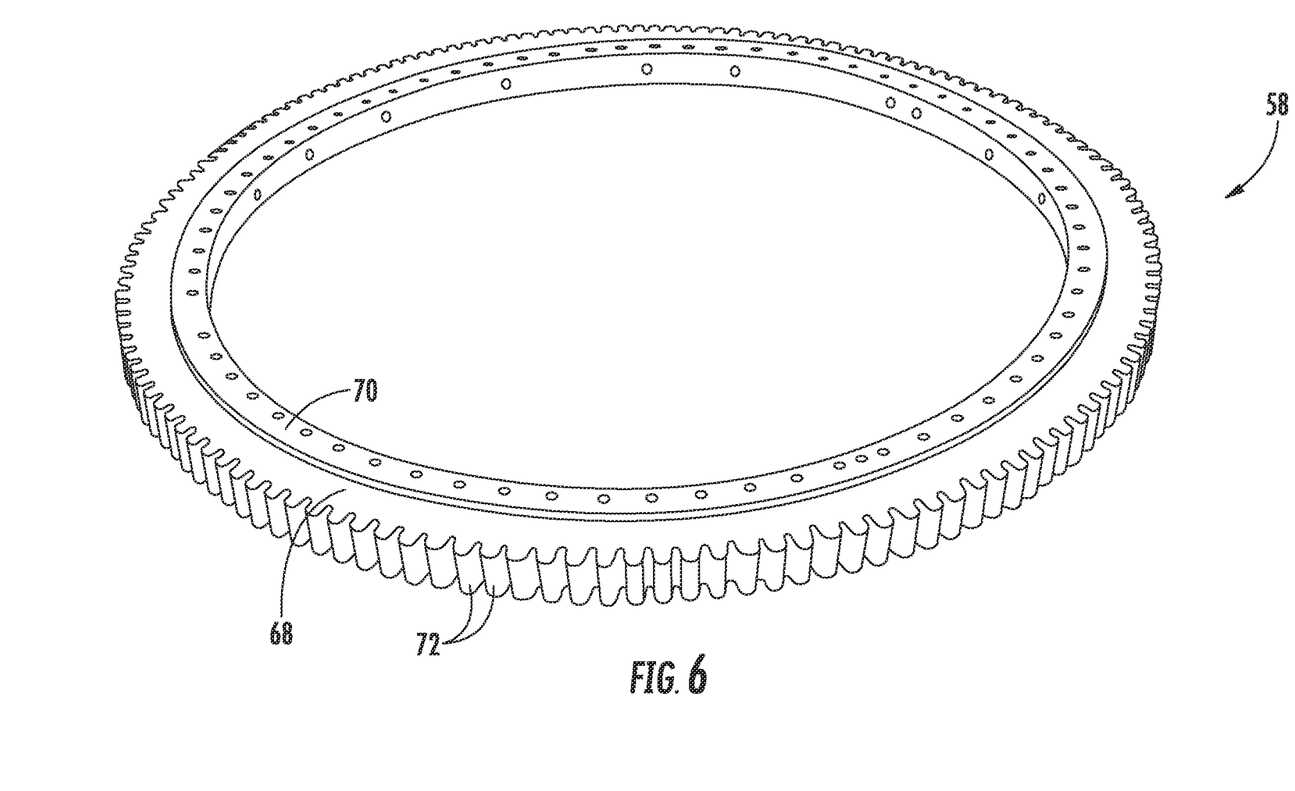
FIG. 6 illustrates a perspective view of one embodiment of a yaw bearing of a wind turbine according to the present disclosure.

Referring now to FIG. 6, the yaw bearing 58 similarly includes an outer bearing race 68, an inner bearing race 70, and a plurality of roller elements (e.g., ball bearings) disposed between the outer and inner races 68, 70. Further, as shown, the inner race 70 of the yaw bearing 58 is generally configured to be mounted to the tower 12 using a plurality of tower bolts (not shown) and/or other suitable fastening mechanisms. Thus, as is generally understood, the inner race 70 may be configured to be rotated relative to the outer race 68 (via the roller elements) to allow the angle of the nacelle 16 to be adjusted. Such relative rotation of the outer and inner races 68, 70 may be achieved using the yaw adjustment mechanism 56 described herein. For example, as shown, a plurality of gear teeth 72 may be formed along an outer circumference of the outer race 68 with the gear teeth 72 being configured to mesh with corresponding gear teeth formed on a yaw drive pinion of the yaw adjustment mechanism 56. Thus, due to meshing of the gear teeth, rotation of the yaw drive pinion results in rotation of the outer race 68 relative to the inner race 70 and, thus, rotation of the nacelle 16 relative to the tower 12.

Figure 7:
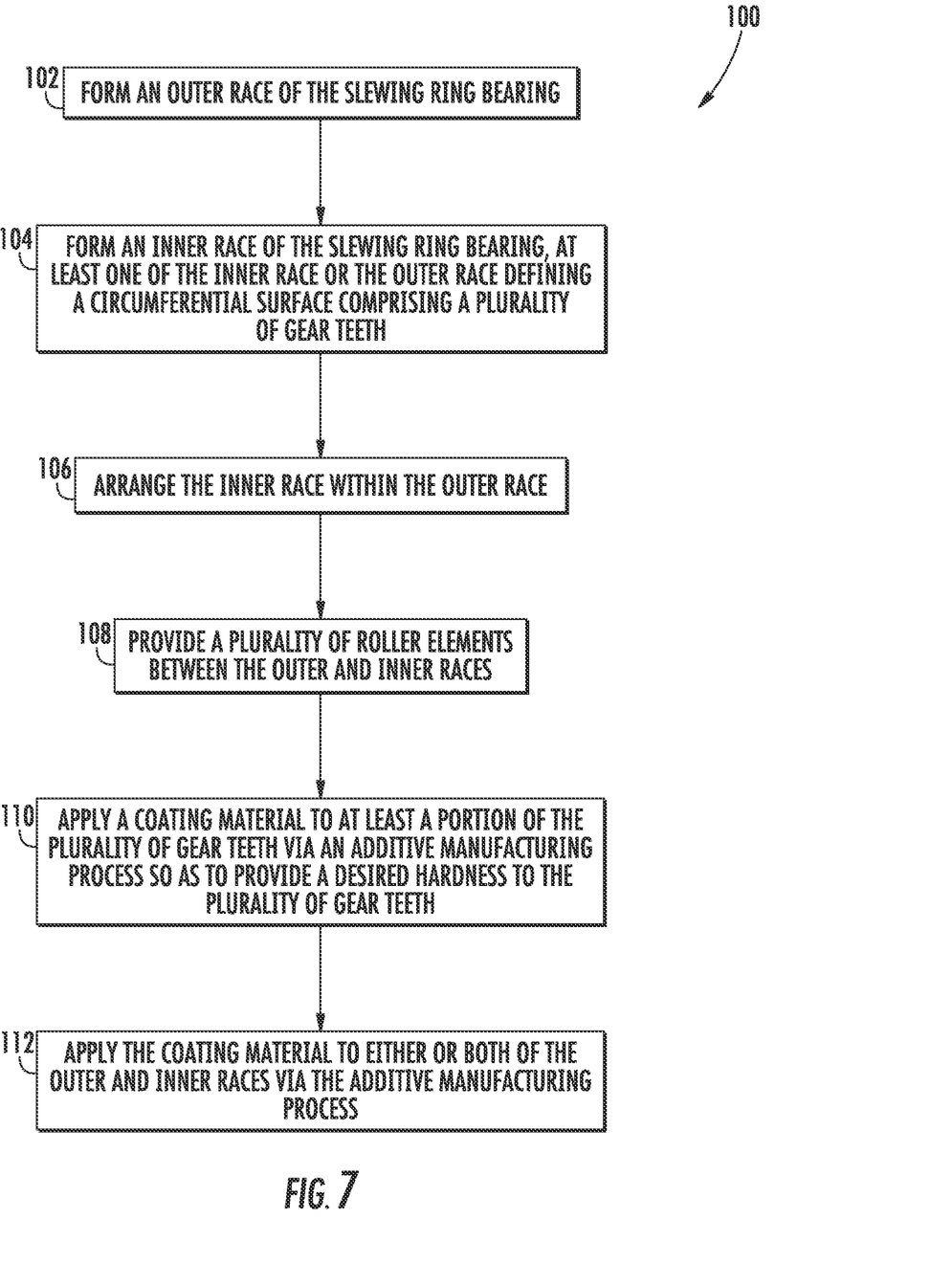
FIG. 7 illustrates a flow diagram of one embodiment of a method for manufacturing a slewing ring bearing for a wind turbine according to the present disclosure.

The inner and outer races of conventional pitch and yaw bearings are manufacturing via a forging process, which can be time-consuming and expensive. Accordingly, the present disclosure is directed to an improved method of manufacturing the yaw and pitch bearings of a wind turbine. Referring now to FIG. 7, a flow diagram of a specific embodiment of a method 100 for manufacturing a slewing ring bearing for a wind turbine (e.g. such as pitch bearing or a yaw bearing) is illustrated in accordance with aspects of the present subject matter. In general, the method 100 will be described herein with reference to the pitch bearing 46 shown in FIGS. 2 and 4-5. However, in other embodiments, the method 100 may be used in connection with any other suitable slewing ring bearing (such as the yaw bearing 58) having any other suitable bearing configuration and/or with any other suitable system having any other suitable system configuration.

It should be appreciated that, although FIG. 7 depicts manufacturing steps or functions performed in a particular order for purposes of illustration and discussion, the manufacturing steps discussed herein are not limited to any particular order or arrangement. One skilled in the art, using the disclosures provided herein, will appreciate that various steps or functions of the methods disclosed herein can be omitted, rearranged, combined, and/or adapted in various ways without deviating from the scope of the present disclosure.

As shown at 102, the method 100 includes forming the outer race 52 of the pitch bearing 46 of a base material. As shown at 104, the method 100 includes forming the inner race 54 of the pitch bearing 46 of the base material. For example, in one embodiment, the outer and inner races 52, 54 may be formed via a casting process. In such embodiments, the outer and inner races 52, 54 may be casted by pouring a liquid material into molds of the outer and inner races 52, 54 and allowing the liquid material to solidify in the molds so as to form the outer and inner races 52, 54. Alternatively, the outer and inner races 52, 54 may be formed using any suitable manufacturing process. In certain embodiments, the base material of the outer and inner races 52, 54 may include steel, iron, ductile iron, or any other suitable material or combinations thereof. In addition, as mentioned, either of the outer or inner races 52, 54 of the pitch bearing 46 may define a circumferential surface that includes gear teeth 62.

Still referring to FIG. 7, as shown at 106, the method 100 includes arranging the inner race 54 within the outer race 52. In addition, as shown at 108, the method 100 includes providing a plurality of roller elements 55 between the outer and inner races 52, 54. For example, in one embodiment, the pitch bearing 46 may include a ball plug (not shown) that can be removed such that the roller elements 55 can be easily inserted between the outer and inner races 52, 54 and then subsequently replaced to maintain the roller elements 55 therebetween.

In addition, as shown at 110, the method 100 includes applying a coating material 74 to at least a portion of the gear teeth 62 via an additive manufacturing process so as to provide a desired hardness, strength, durability, etc. to the gear teeth 62. In other words, since the coating material is different than the base material, the coating material provides increased hardness, strength, and/or durability to the base material.

Figure 8:
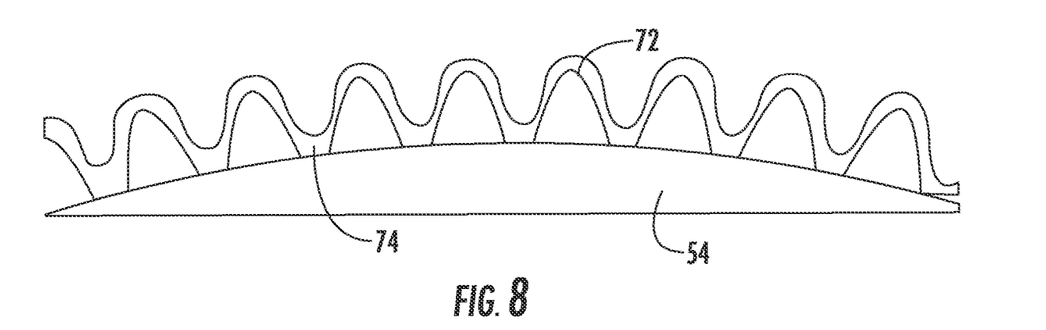
FIG. 8 illustrates a cross-sectional view of one embodiment of an inner race of a pitch bearing according to the present disclosure, particularly illustrating a coating material printed onto the gear teeth of the inner race.

In particular embodiments, only the portion of gear teeth 62 that engages that pitch drive mechanism 32 (i.e. from about 0-degrees to about 180-degrees or half of the gear teeth 62) may be printed with the coating material 74. In another embodiment, as shown at 112, the method 100 may also include applying the coating material 74 to either or both of the outer and inner races 52, 54 (in addition to the gear teeth 62) via the additive manufacturing process. For example, as shown in FIG. 8, the coating material 74 is applied to the inner race 54 to obtain the desired hardness, strength, durability, etc.

As used herein, an additive manufacturing process generally refers to processes used to deposit materials under computer control to create a shape. Thus, the additive manufacturing processes described herein may include cold spraying, thermal spray, laser cladding, binder jetting, material jetting, directed energy deposition, powder bed fusion, or any other suitable additive manufacturing process. Accordingly, in one embodiment, the coating material 74 may be applied to the gear teeth 62 via cold spraying.

In addition, the coating material(s) 74 described herein may include, but is not limited to, boron nitride, aluminum oxide, silicon carbide, tungsten carbide, a nickel-based alloy, or any other material capable of providing the desired hardness, strength, durability, etc. In further embodiments, the method 100 may also include machining the gear teeth 62 after applying the coating material 74. In such embodiments, the method 100 may include hobbing and/or grinding the gear teeth 62 after applying the coating material 74.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for manufacturing a slewing ring bearing for a wind turbine wherein the slewing ring bearing engages with a drive mechanism, the method comprising:
    forming an outer race of the slewing ring bearing from a base material;
    forming an inner race of the slewing ring bearing from the base material, at least one of the inner race or the outer race defining a circumferential surface comprising a plurality of gear teeth;
    arranging the inner race within the outer race;
    providing a plurality of roller elements between the outer and inner races;
    applying a coating material to all or less than all of the plurality of gear teeth via an additive manufacturing process, the coating material being different than the base material, the coating material providing at least one of increased hardness, strength, or durability to the base material;
    applying the coating material to at least one of the outer race or the inner race via the additive manufacturing process; and
    further comprising machining the coating material from at least one of the inner race, the outer race, or the plurality of gear teeth.

2. The method as claimed in claim 1, wherein the additive manufacturing process comprises at least one of cold spraying, thermal spray, laser cladding, binder jetting, material jetting, directed energy deposition, or powder bed fusion.

3. The method as claimed in claim 1, wherein the coating material comprises at least one of boron nitride, aluminum oxide, silicon carbide, tungsten carbide, or a nickel-based alloy.

4. The method as claimed in claim 1, wherein forming the outer race and the inner race of the slewing ring bearing further comprises casting the outer race and the inner race.

5. The method as claimed in claim 4, wherein casting the outer race and the inner race further comprises:
    pouring a liquid material into molds of the inner race and the outer race; and,
    allowing the liquid material to solidify in the molds so as to form the inner race and the outer race.

6. The method as claimed in claim 1, wherein the base material comprises at least one of steel, iron, or ductile iron.

7. A method for manufacturing a slewing ring bearing for a wind turbine wherein the slewing ring bearing engages with a drive mechanism, the method comprising:
    forming an outer race of the slewing ring bearing from a base material;
    forming an inner race of the slewing ring bearing from the base material, at least one of the inner race or the outer race defining a circumferential surface comprising a plurality of gear teeth;
    arranging the inner race within the outer race;
    providing a plurality of roller elements between the outer and inner races;
    applying a coating material to the plurality of gear teeth via an additive manufacturing process, the coating material being different than the base material, the coating material providing at least one of increased hardness, strength, or durability to the base material;
    applying the coating material to at least one of the outer race or the inner race via the additive manufacturing process; and
    further comprising machining the coating material from at least one of the inner race, the outer race, or the plurality of gear teeth.

8. The method as claimed in claim 7, wherein machining the plurality of gear teeth further comprises at least one of hobbing or grinding the plurality of gear teeth after applying the coating material.

9. The method as claimed in claim 1, wherein only the gear teeth that engage the drive mechanism include the coating material and extend with a range of from 0-degrees to 180-degrees of the circumferential surface of the slewing ring.

10. The method as claimed in claim 1, wherein the slewing ring bearing comprises at least one of a pitch bearing or a yaw bearing of the wind turbine.

* * * * *